United States Patent [19]

Shube

[11] Patent Number: 4,563,908

[45] Date of Patent: Jan. 14, 1986

[54] HIGH SPEED, DUAL OPERATED ELECTROMECHANICAL ACTUATOR

[75] Inventor: Eugene E. Shube, Elmont, N.Y.

[73] Assignee: Plessey Incorporated, New York, N.Y.

[21] Appl. No.: 589,572

[22] Filed: Mar. 14, 1984

[51] Int. Cl.[4] .......................................... G05G 17/00
[52] U.S. Cl. ................................. 74/2; 74/785; 185/40 R
[58] Field of Search ............... 74/2, 785; 185/40 R; 200/40; 251/67, 71

[56] References Cited

U.S. PATENT DOCUMENTS

| | | | |
|---|---|---|---|
| 2,430,940 | 11/1947 | Leland | 89/1.5 |
| 2,721,721 | 10/1955 | Aubert | 74/785 X |
| 2,930,571 | 3/1960 | Vogl | 251/71 X |
| 3,038,352 | 6/1962 | Murphy | 74/626 |
| 3,113,473 | 12/1963 | Morlen | 74/2 X |
| 3,248,579 | 4/1966 | Plasko | 310/23 |
| 3,373,528 | 3/1968 | Tinder et al. | 49/349 |
| 3,374,372 | 3/1968 | Tinder et al. | 310/80 |
| 3,463,951 | 8/1969 | Bauerle et al. | 310/51 |
| 3,469,128 | 9/1969 | Cartier | 310/83 |
| 3,660,704 | 5/1972 | Paine et al. | 310/80 |
| 4,393,319 | 7/1983 | Bock | 310/80 |
| 4,398,109 | 8/1983 | Kuwako | 310/80 |

Primary Examiner—Allan D. Herrmann
Attorney, Agent, or Firm—Fleit, Jacobson, Cohn & Price

[57] ABSTRACT

An electromechanical actuator is disclosed that is capable of high-speed and high force operation having a movable ram member that is biased toward executing a mechanical motion. A solenoid disengages a locking brake that via one input to a differential transmission triggers a high power mechanical stored energy to cause the ram member to execute its motion. A d.c. motor is connected to the other input of the differential transmission and provides an alternate to release the locking brake in the event of failure of the solenoid. Upon reversal of the polarity of the power supply to the motor, the ram member is reset.

21 Claims, 8 Drawing Figures

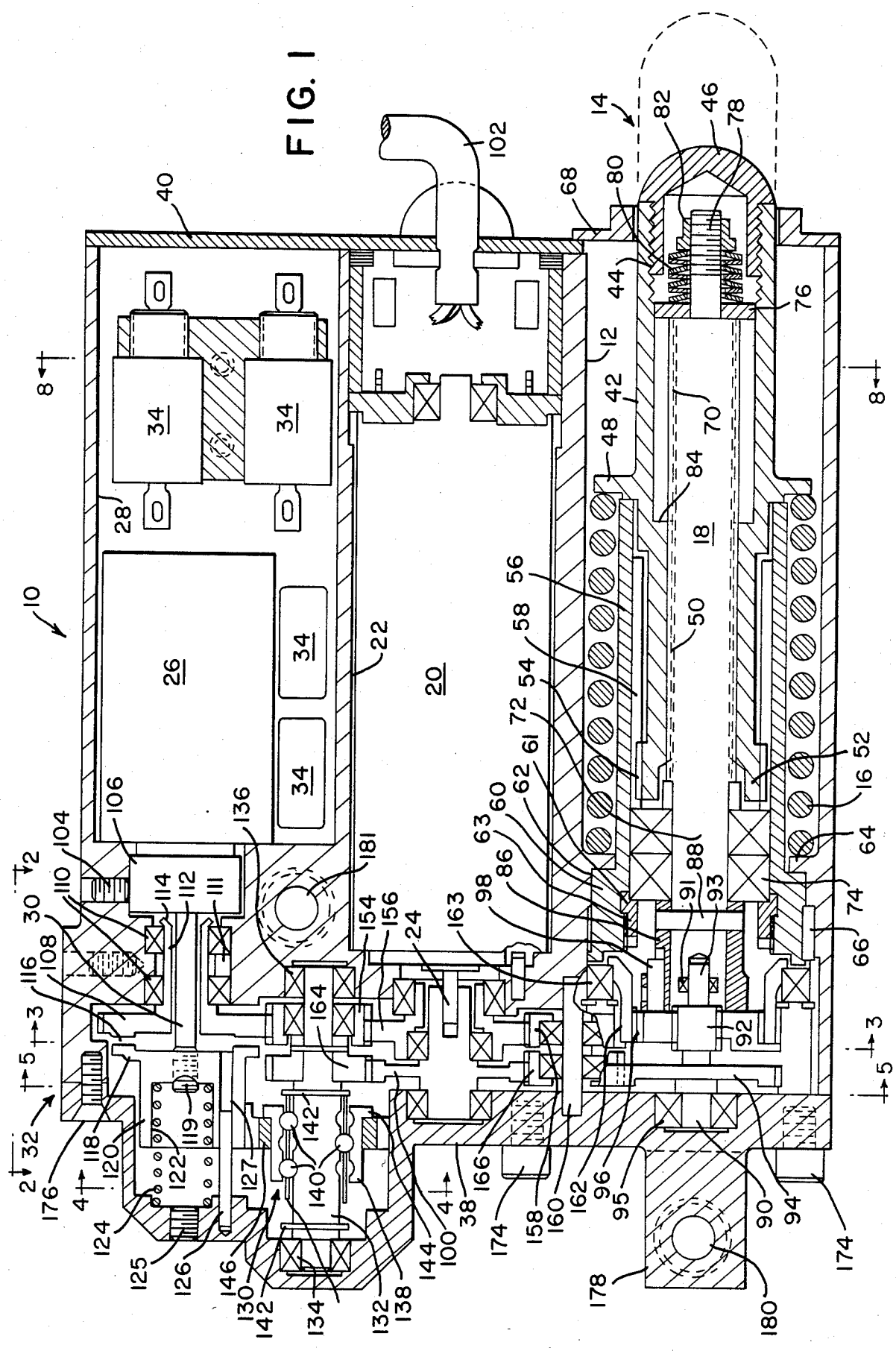
FIG. I

HIGH SPEED, DUAL OPERATED ELECTROMECHANICAL ACTUATOR

BACKGROUND OF THE INVENTION

Field of the Invention

This invention relates to electromechanical actuators, and more particularly to an electromechanical actuator that is capable in one direction of delivering a high force over a long distance and during a short time, and in the other direction will deliver the same force over a longer period of time.

Actuators are required in applications where environmental conditions are severe in terms of ambient temperatures or pressures, and space and weight requirements dictate the use of very small devices. Examples of such applications are aircraft applications, such as bomb rack release actuators, thrust reverser interlock actuators, emergency shut-off actuators, such as for fuel or air, and the like.

It is thus an object of the present invention to provide an improved actuator that is capable of delivering a high force over a relatively long distance and in a very short time for one direction of operation, and in which the time to accomplish the other direction of operation can be longer.

It is another object of the present invention to provide a quick-acting actuator that can fit within the space of a few inches.

It is a further object of the present invention to provide a quick-acting actuator that includes two separate and independent drive means in the event of failure of the primary drive means.

It is still another object of the present invention to provide a compact, quick-acting actuator that includes integral return means to return the actuator after it has completed its operation.

SUMMARY OF THE INVENTION

Briefly stated, in accordance with one aspect of the present invention, a high-speed, spring-actuated device is provided that is capable of providing a high force over a long distance, and for a very short time for one direction of operation, and in which the time to accomplish the other direction of operation is longer. The device is relatively light in weight, and occupies a very small space. The operation of the device can prooduce a linear extending power stroke, a linear retracting power stroke, or a rotary clockwise power stroke or a rotary counterclockwise power stroke, or combinations of rotary and linear power strokes. The device includes a housing, and an operating member carried within the housing and adapted to perform either a linear or a rotary power stroke, or a combination thereof, upon actuation. An energy storage means is provided to act on the operating member for urging it linearly or rotationally, or some compound movement thereof, during operation, and restraining means are provided for restraining the operating member from its movement until an actuating signal is received. The actuation includes release means for releasing the restraining means to thereby permit the energy storage means to rapidly impart the required movement for the power stroke.

BRIEF DESCRIPTION OF THE DRAWINGS

FIG. 1 is a side cross-sectional view of an actuator in accordance with the present invention showing the several elements thereof in their operative relationship.

DESCRIPTION OF THE PREFERRED EMBODIMENT

Figure 3:
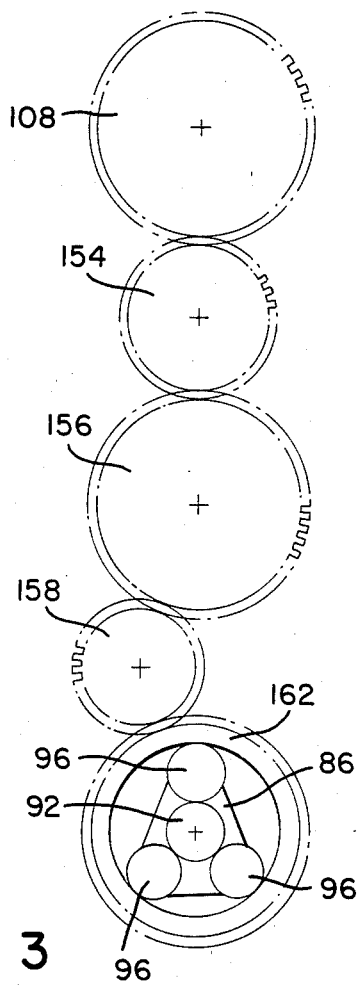
FIG. 3 is a cross-sectional view of the actuator of FIG. 1 taken along the line 3—3 thereof and showing one of the gear trains therein.

The invention is herein described in terms of a specific embodiment of a electromechanical linear actuator that delivers high power in a short time during an extension stroke. From the teachings of this preferred embodiment it will be readily apparent to those skilled in the art that the actuator may be adapted to deliver high power in the retract sense, or may be adapted to deliver high power in a rotary sense, as required, in either a clockwise or counterclockwise direction.

Referring now to the drawings, and particularly to FIG. 1 thereof, there is shown a cross-sectional view of a preferred embodiment of the present invention which is in the form of an electromechanical linear actuator delivering high power in the extension stroke. The actuator includes a housing 10 that can be made of aluminum alloy for light weight. Housing 10 includes a ram bore 12 for receiving a linearly movable operating means or ram 14 that is movable outwardly from bore 12 by an energy storage means in the form of a compression coil spring 16. Threadedly positioned within ram 14 is jack screw 18, the innermost end of which is operatively connected with a transmission means in the form of a gear train, the structure and operation of which will be described in further detail hereinafter. A motor 20 is carried in a motor bore 22 in housing 10, the motor having a drive shaft 24 that extends in a generally parallel direction relative to the axis of ram 14 and is also connected with the gear train. A trigger means in the form of a solenoid 26 is provided in a solenoid bore 28 in housing 10, the solenoid having a plunger 30 that disengages a jaw brake assembly that is also connected with the gear train. Electrical filters 34 are provided to attenuate interference and transients in the power lines to and from motor 20. A gear train cover 38, and a bore cover 40 enclose the opposite ends of the housing 10.

Ram 14 is provided in the form of a tubular ram body 42 that includes an internally threaded end 44 to which an externally threaded, rounded end cap 46 is attached. Ram body 42 has between its respective ends coupling means in the form of a radially outwardly extending flange 48 and includes an internal thread 50 formed on the inner bore thereof. At its end 52, opposite to end cap 46, ram body 42 includes an external spline 54. Concentrically positioned in surrounding relationship to the inner portion of body 42, between flange 48 and spline 54, is a sleeve 56 that is fixed relative to housing 10 and includes an internal spline 58 that engages with external spline 54 on ram body 42. Sleeve 56 includes an enlarged inner end 60 that is received in a circular recess 62 formed in housing 10 and separated from ram bore 12 by an inwardly extending flange 64 that serves as a stop to prevent outward axial movement of sleeve 56 toward bore cover 40. Sleeve 56 is non-rotationally secured to housing 10 by means of a plurality of circumferentially positioned, axially extending pins 66, only one of which is visible in FIG. 1.

Positioned within ram bore 12 and in surrounding relationship with sleeve 56 is compression coil spring 16, one end of which bears against flange 64 and the other end of which bears against outwardly extending flange 48 on ram body 42. Spring 16 serves to forcibly urge ram 14 in an outward direction relative to ram bore 12, from the position illustrated in full lines in FIG. 1 to the position illustrated in dashed lines. Outward movement of ram 14 from ram bore 12 is limited by retainer 68 that surrounds ram body 42 and is secured to bore cover 40 by means of bolts (not shown). Retainer 68 serves as a stop by preventing flange 48 from passing out of ram bore 12 beyond cover 40.

Positioned within ram 14 is an elongated jack screw 18 having an external thread 70 that is in threaded engagement with the internal thread 50 formed in ram body 42. Preferably, screw 18 is of the multiple start type, to permit rapid relative movement between the ram body and the screw, and to permit rotation of the screw by axial force applied to the end cap 46, as will hereinafter be described in connection with the operation of the actuator. An example of a suitable screw thread is a 5/16-14 quad Acme screw. The screw includes a non-threaded body 72 that is rotatably carried in a pair of ball bearings 74 that have their outer races retained within sleeve inner end 60 by means of a threaded nut 61 threadedly engaged with threads 63 formed in the sleeve inner end 60.

The outermost end of screw 18, relative to ram bore 12, receives a stop washer 76 that fits over a smaller diameter threaded end 78 of the screw 18. Positioned against stop washer 76 on the opposite side from external thread 70 is a spring assembly 80 in the form of a plurality of oppositely disposed Belleville washers that are held on end 78 of the screw by means of a lock nut 82. Stop washer 76 extends radially outwardly beyond external thread 70 and serves as a stop by preventing inwardly directed shoulder 84 of ram body 42 from passing therebeyond. The Belleville washers in combination with stop washer 76 and nut 82 define a shock absorber to cushion the end of the actuator stroke. The opposite end of screw 18 from threaded end 78 has a planet carrier 86 that surrounds the end and is secured thereto by pin 88. A gear shaft 90 having a sun gear 92 and a drive gear 94 fixed thereto is freely mounted in bearings 91 in a bore 93 formed in the end of jack screw 18 and a bore 95 formed in cover plate 38 by means of bearings 97. Planet carrier 86 carries three planet gears 96 (only one of which is visible in FIG. 1) each of which is rotatably carried on a planet shaft 98. Additional details relating to the gears and their operation as a part of a gear train will be hereinafter described in further detail.

Motor bore 22 is arranged in housing 10 in laterally spaced and generally parallel relationship with ram bore 12 and houses motor 20, which includes a drive shaft 24 that has drive gear 100 secured thereto and fixed to rotate with the drive shaft. Motor 20 is securely and non-rotatably positioned within motor bore 22 and is preferably a D.C., permanent magnet type motor characterized by magnetic force detents at various armature positions, ensuring absence of free wheeling when not energized, and stability when subjected to vibration. A connector cable 102 extends through cover 40 to conduct power to the motor.

Solenoid bore 28 is laterally spaced from and generally parallel with bores 12 and 22 hereinbefore described. Solenoid bore 28 includes solenoid 26 that is positioned with its axis generally parallel with the axis of drive shaft 24 of motor 20, and parallel with the axis of the screw 18 and ram 14 combination. Solenoid 26 is secured in position by means of a set screw 104 that bears against a reduced diameter positioning collar 106 that extends axially outwardly from the body of solenoid 26. Solenoid plunger 30 extends from collar 106 and through the center of a brake gear 108. Brake gear 108 is freely rotatable relative to solenoid plunger 30. As shown in FIG. 1, brake gear 108 includes an outwardly axially extending, integral hollow shaft 112 that terminates in an outwardly flared end 114. Bearings 110 are separated by spacer 111 and are positioned on shaft 112. The subassembly consisting of brake gear 108, shaft 112, bearings 110, and spacer 111 are retained by means of a set screw 113 in a bore defined in housing 10. Bearings 110 and spacer 111 are slid onto shaft 112 prior to flaring its end as shown at 114. Also included within solenoid bore 28 are electrical filters 34 for EMI and RF suppression in order to filter electrical interference and ensure smooth and reliable operation of the device.

The jaw brake includes brake gear 108 and locking jaw 118. Solenoid plunger 30 slidably extends through the hollow shaft 112 and terminates adjacent the locking jaw 118. Brake gear 108 has a series of serrations 116 of a rachet-tooth-like configuration (see FIG. 2) which are positioned on the face of brake gear 108 opposite to the solenoid in an annular pattern. Positioned in engagement with brake gear 108 is a locking jaw 118 that includes cooperating complementary serrations to engage the serrations on the face of brake gear 108. Locking jaw 118 has an annular projection 120 that defines a recess 122 opening in a direction away from brake gear 108. A brake spring 124 is received within recess 122, bearing against locking jaw 118, the other end of which bears against the end wall defined by gear train cover 38. A bore defined by the central portion of locking jaw 118 and a set screw 119 is threadedly positioned in the bore in alignment with the plunger 30 of the solenoid for the purpose of establishing a contact spacing between the end of shaft 30 and the locking jaw 118 to calibrate the disengagement of the jaw brake. A cover screw 125 is threadedly engaged in gear train cover 38 in alignment with set screw 119 to allow access for adjustment. Thus locking jaw 118 is spring biased into cooperating engagement with brake gear 108 through interengaging serrations 116, and is movable in an axial direction relative to solenoid 26 from a first position in which it is in contact with brake gear 108, to a second position where it is axially spaced therefrom. Locking jaw 118 is axially slidably carried on three guide pins 126 (only one of which is shown in FIG. 1) that are fixed in apertures formed in gear train cover 38 and extend inwardly from gear train cover 38 to be slidably received in apertures 127 in jaw 118, and which serve as axial guides and as anti-rotational restraints to guide the movement thereof in an axial direction relative to the solenoid. Therefore locking jaw 118 is supported nonrotationally relative to housing 10, and when it is engaged with brake gear 108, the latter is restrained from rotation about its axis in one direction against the restraining force of the ratchet teeth, but is rotatable in the opposite direction by virtue of the orientation of the ratchet teeth. Conversely, when locking jaw 118 is separated from brake gear 108, the latter can be freely rotated.

Also provided within the housing adjacent to the jaw brake is an epicyclic ball screw mechanism 130 that is spaced from and generally parallel to the axis of the solenoid. Ball screw mechanism 130 includes a shaft 132 that is rotatably journalled in bearings 134 and 136 carried in gear train cover 38 and in housing 10, respectively, for rotation about its own axis. Shaft 132 defines helical ball races or tracks. An annular collar 138 is mounted on shaft 132 and defines annular ball races on tracks. Carried between shaft 132 and collar 138 in their respective tracks are a plurality of balls 140. Cage 141 is interfitted between the shaft 132 and the collar 138 to maintain ball spacing. An example of such an specific ball screw mechanism is shown in U.S. Pat. No. 2,739,491; another example is a ball screw product available from Motion Systems Corporation of Shrewsbury, N.J. A pair of outwardly extending, spaced stop pins 142 are provided in and extend transversely of shaft 132 to define the limits of axial travel of cage 141.

Figure 4:
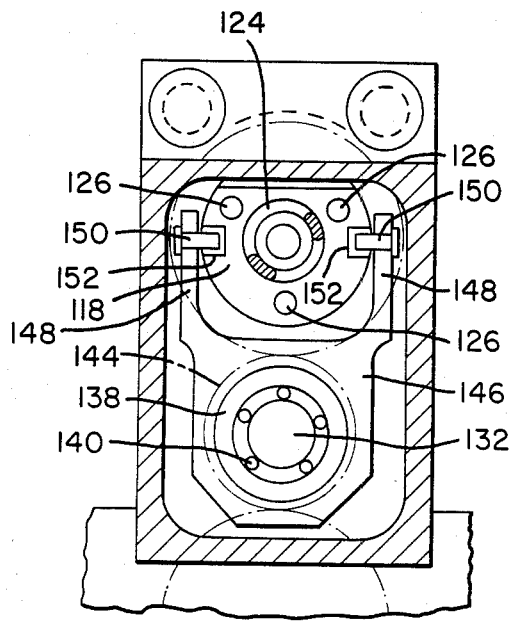
FIG. 4 is a fragmentary cross-sectional view of the actuator of FIG. 1 taken along the line 4—4 thereof.

As best seen in FIG. 4, positioned around and caried by collar 138 and against flange 144 of collar 138 is a plate 146 that includes yoke arms 148 carrying a pair of inwardly extending pins 150 that engage respective diametrically opposed, external axial slots 152 formed in the outer surface of annular body 120. Thus, as an alternate means of moving locking jaw 118 away from brake gear 108, shaft 132 of ball screw mechanism 130 is caused to rotate, in a manner to be hereinafter described, driving the collar 138, and plate 146 in a direction away from brake gear 108 to move locking jaw 118 out of engagement with brake gear 108.

Referring to FIGS. 1 and 3, a first gear train forming part of the transmission means includes a plurality of intermeshing gears that extend between brake gear 108 and sun gear 92. In meshing engagement with brake gear 108 is an idler gear 154 that is freely rotatably carried on shaft 132 of ball screw mechanism 130. Idler gear 154 is in meshing engagement with idler gear 156 that is freely rotatably carried in housing 10 via bearings 155 and idler gear 156 is, in turn, in meshing engagement with idler gear 158 that is rotatably carried on a shaft 160 nonrotatably carried by gear train cover 38 and housing body 36. Idler gear 158 is in meshing engagement with the external teeth of an annular ring gear 162 that includes both external and internal teeth, and that is rotatably carried by housing 10 via a bearing 163. Positioned within ring gear 162 and in meshing engagement with the internal teeth thereof are planet gears 96 that surround and are in meshing engagement with sun gear 92 carried by shaft 90. Thus the several interengaging gears define a gear train, the gears of which are rotatable when locking jaw 118 of the jaw brake is released from engagement with clutch gear 108.

Figure 5:
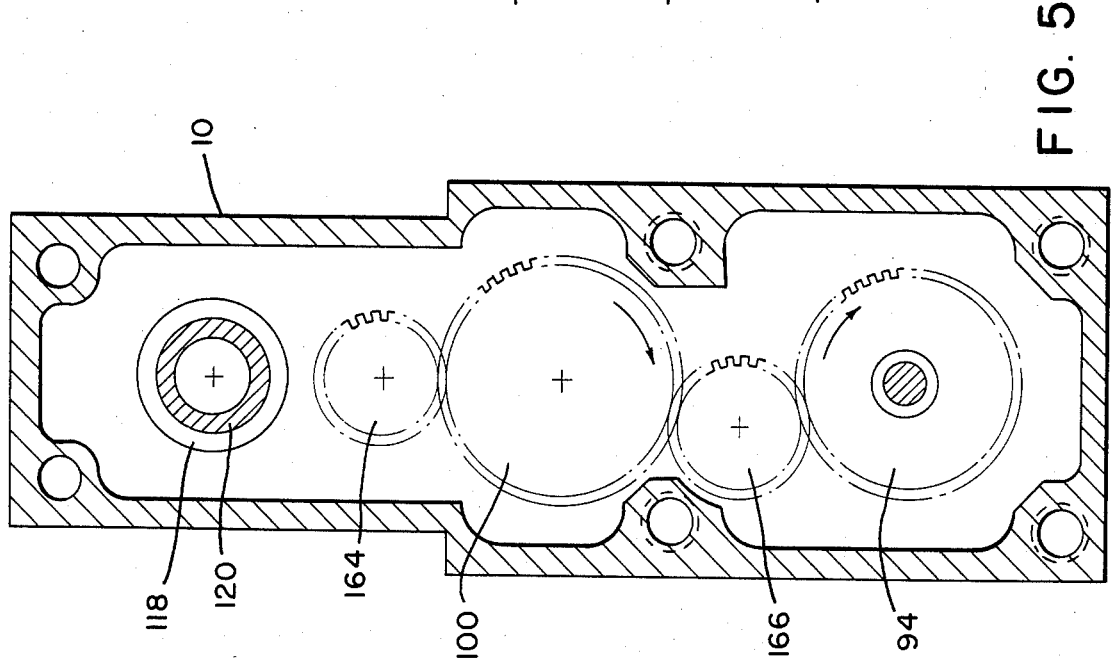
FIG. 5 is a cross-sectional view of the actuator of FIG. 1 taken along the line 5—5 thereof.

As best seen in FIGS. 1 and 5, a second gear train, that is parallel with and spaced axially from the above-described first gear train, also forms a part the transmission means and includes a ball screw gear 164 that is non-rotatably secured to ball screw shaft 132. Ball screw gear 164 is in meshing engagement with drive gear 100 that is non-rotatably secured to motor drive shaft 24. Drive gear 100 engages with idler gear 166, freely rotatably carried by shaft 160, and the latter idler gear is in engagement with drive gear 94 that is secured to shaft 90.

Figure 6:
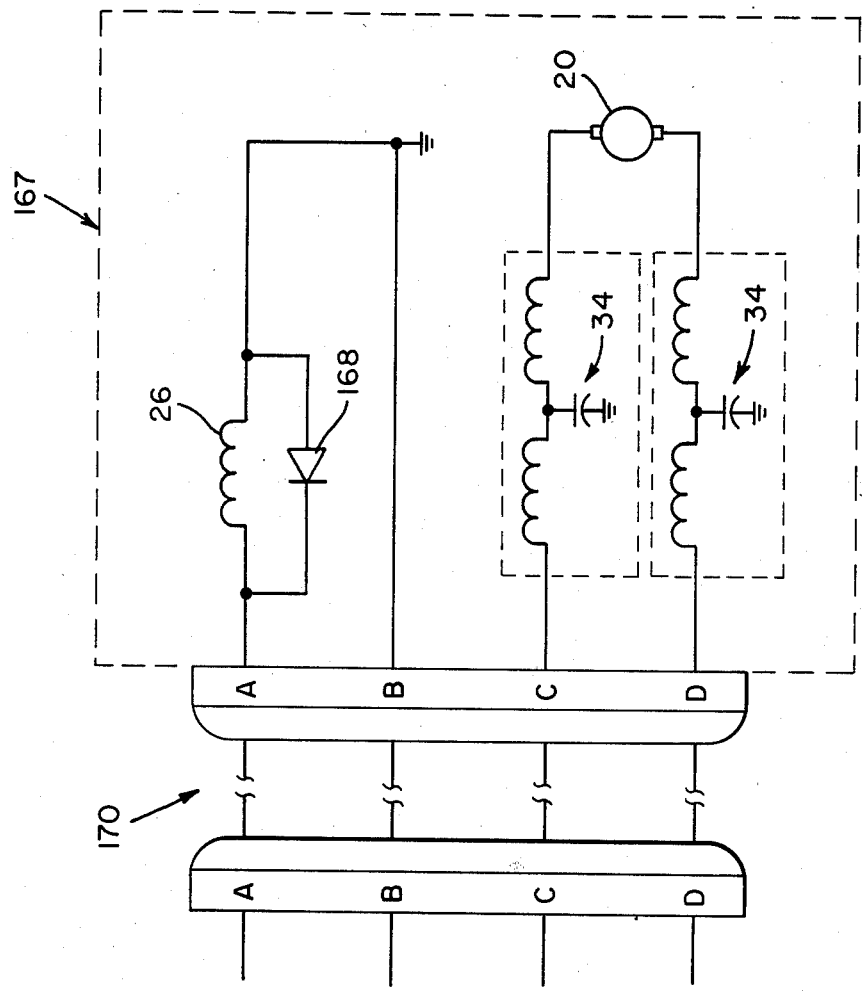
FIG. 6 is an electrical schematic view showing the electrical components of the actuator.

Referring now to FIG. 6, the control circuit 167 for the control and operation of the actuator includes solenoid 26, with diode 168, connected in parallel, which assists in suppressing EMI and stretching the operating pulse. As was noted earlier, the actuator includes filters 34 that are in series with the motor coil windings and connected between the motor coil windings and ground to provide suppression of extraneous signals that could adversely affect the operation of the device. The solenoid actuation signal is applied to terminal A of connector 170, while the power for motor operation is applied to terminals C and D, the particular polarity selected serving to determine the direction of rotation of the motor.

Figure 7:
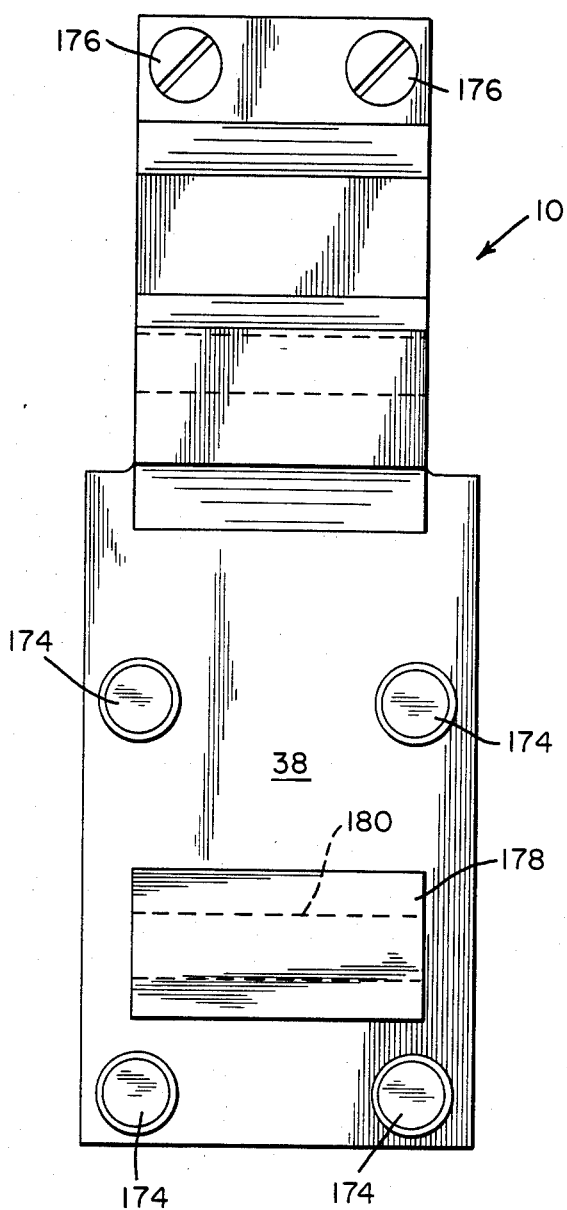
FIG. 7 is a side view of the actuator of FIG. 1.

As shown in FIGS. 1 and 7, gear train cover 38 is secured to housing 10 with bolts 174 and screws 176, and a mounting boss 178 is provided that has a through-bore 180 which, together with bore 181 in housing 10 permits the actuator to be securely and rigidly mounted in the desired position.

Figure 8:
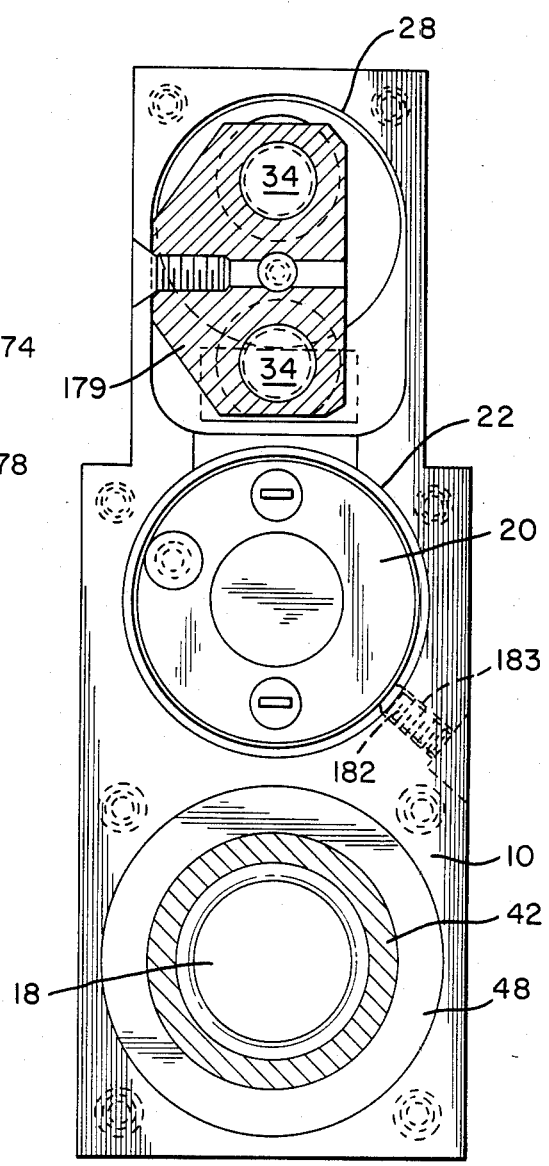
FIG. 8 is a cross-sectional view of the actuator of FIG. 1 taken along the line 8—8 thereof.

The opposite end of housing 10 is shown in a cross-sectional view in FIG. 8. Solenoid bore 28 includes a bracket 179 that supports filters 34, and motor bore 22 communicates with the side of housing 10 by means of threaded aperture 183 to receive set screw 182 that bears against motor 20 to secure it in position in bore 22.

The actuator of the present invention is intended to operate in accordance with several alternative operating modes. The primary operating mode involves actuation of the solenoid 26, which serves as a trigger means to provide a first input to the transmission means cause solenoid output plunger 30 to move axially toward gear train cover 38, and to cause locking jaw 118 to move axially along guide pins 126 against the force of brake spring 124, so that locking jaw 118 is spaced from and out of engagement with brake gear 108. When locking jaw 118 has been disengaged from brake gear 108, the latter is free to rotate because it is no longer restrained from rotation by its engagement with the non-rotatable locking jaw. In that condition, the force imposed by compression coil spring 16 on ram flange 48 causes ram 14 to move axially outwardly, causing screw 18 to turn, and with it planet gears 96, ring idler gear 162, idler gear 158, idler gear 156, idler gear 154, and brake gear 108. Thus the entire gear train is capable of rotation, and by virtue of the elimination of the restraint imposed on the gear train by the locking jaw, the ram spring causes the ram to move outwardly from the housing and accomplish the desired actuation operation. It can thus be seen that the jaw brake serves as a restraining means, and acts through the gear train to hold the screw stationary which, in turn, holds the ram stationary. Deenergization of the solenoid trigger means causes the solenoid to reset itself.

A second mode of operation of the device would become effective if for some reason the solenoid were not to operate properly to disengage locking jaw 118 from brake gear 108 and thereby unlock the gear train and permit extension of the ram. In this mode of operation, power would be sent to motor 20 to cause it to rotate in the direction to drive ball screw gear 164 and to provide a second input to the transmission means so that ball screw 132 moves plate 146 to carry locking jaw 118 out of engagement with brake gear 108.

Should the ball screw mechanism fail to operate properly and disengage locking jaw 118 from brake gear 108, or should any part of the first gear train fail to rotate, motor 20 will continue to rotate even after cage 141 reaches pin 142 and shaft 132 will continue to rotate in place. Motor 20 will continue to drive motor gear 100 through idler gear 166 which, in turn, rotates drive gear 94, thereby causing screw 18 to turn, by means of planet carrier 86, and extend ram 84 outwardly. In this latter mode of operation, however, the speed of rotation of screw 18 is slower than it would be if the free wheeling gear train arrangement were permitted to operate in accordance with either of the first or second modes as hereinabove described. Thus it can be seen that the present invention includes backup actuation means to ensure the operation of the device under any of several possible failure modes.

Ram 14 is permitted to move rapidly in each of the first or second modes of operation, and in order to prevent damage, spring assembly 80 serves to cushion the force when the ram has reached the outermost portion of its path of travel. When that occurs, shoulder 84 contacts stop washer 76 and pushes it against the Belleville washers, thereby decelerating the ram member before it reaches the full extent of its travel.

Figure 2:
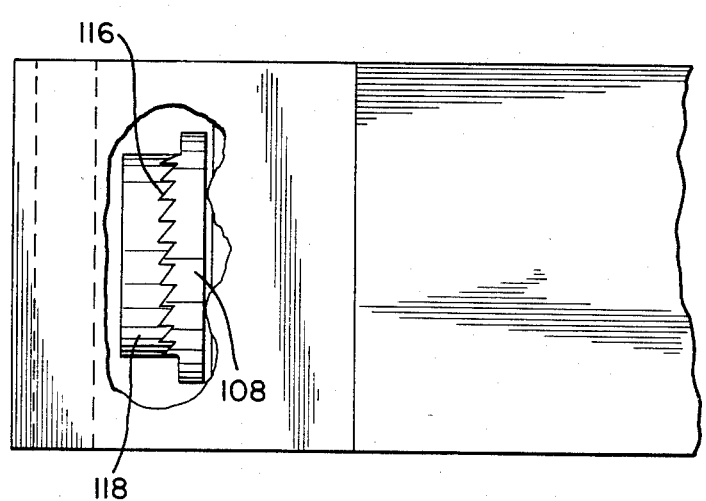
FIG. 2 is a fragmentary top view of the actuator of FIG. 1, partially broken away to show a jaw brake structure.

Once the ram has been extended, it can be retracted for a subsequent actuation operation by reversing the direction of operation of motor 20, to cause screw 18 to draw the ram member inwardly until it has reached its innermost position. During retraction, the jaw brake is ratcheting. When the ram 14 is fully retracted and the spring has been loaded motor 20 is stopped, the device is locked against rotation by the jaw brake and by the magnetic detent of the motor, and is ready for an additional actuation operation. In an emergency, the ram can be manually reset to its retracted position by pushing the ram inwardly of the housing against the resistance of spring 16, the result being to drive the gear train in the opposite direction. Because the jaw brake serrations are in the form of ratchet teeth inclined in one direction, as illustrated in FIG. 2, the interengaging teeth are inclined so that they permit rotation in the retract direction and thereby enable ram 14 to be repositioned in its retracted position.

Further, although the invention has been described with respect to a preferred embodiment, various modifications will be evident to one skilled in the art. For example, the operation of the device may be arranged so that the power stroke is in the retract direction simply by putting spring 16 on the outboard side of flange 48, rearranging the jaw brake angles and putting the stop washer 76 on the other side of spring 80. The device may be used as a rotary actuator if the output is taken from the end of screw 18, and such output could be preferred in either direction depending on the hand of jaws 108 and 118 and/or the hand of the screw threads 50. Further, the jack screw need not be an Acme screw but may be a ball screw, roll screw, or any similar arrangement familiar to practicioners in the art.

The energy storage means need not be a mechanical wire spring, compression or tension type, but may be any other form of mechanical energy storage device such as a gas spring or an elastomer or the like.

The motor need not be a permanent magnet motor, for any DC or AC motor could be used if the motor were equipped with a suitable integral brake which were applied when the motor is not energized.

Although particular embodiments of the invention have been illustrated and described, it will be apparent to those skilled in the art that various changes and modifications can be made without departing from the spirit or scope of the present invention, and it is intended to encompass within the appended claims all such changes and modifications that fall within the scope of the present invention.

What is claimed is:

1. A high speed stored energy operated electromechanical actuator comprising:
   energy storage means;
   an operating means for executing a power delivery mechanical motion and and an energy storing mechanical motion, coupling means coupling said energy storage means and said operating means such that when said operating means executes a power delivery mechanical motion said operating means is being driven by said energy storage means, and when executing an energy storage mechanical motion said operating means is driving said energy storage means and storing energy therein;
   reversible gear transmission means having an output coupled to said operating means and having two independent inputs;
   trigger means coupled to one input of said transmission means to trigger operation of said operating means whereupon said operating means is driven by said energy storage means to execute a power delivery mechanical motion, said trigger means being capable of resetting itself, and a reversible electric motor coupled to said other input which in one direction of rotation drives said operating means through said transmission means to execute an energy storage mechanical motion to store energy in said energy storage means and which in its other direction of rotation drives said operating means through said transmission means to execute a power delivery mechanical motion.

2. An actuator according to claim 1, wherein said electric motor is coupled to said trigger means and when energized to operate in its other direction of rotation initiates said trigger means thereby triggering operation of said operating means wherein said operating means is driven by said energy storage means in parallel with and free of restraint by said electric motor which also drives said operating means via said other input.

3. An actuator according to claim 2, wherein said trigger means includes a jaw brake that restrains said first input.

4. An actuator according to claim 3, wherein said trigger means includes a solenoid for releasing said jaw brake.

5. An actuator according to claim 4, wherein said trigger means includes means to open said jaw brake that is operated by said electric motor when driven in its opposite direction of rotation.

6. An actuator according to claim 5, wherein said opening means includes ball screw means driven by said electric motor for disengaging said jaw brake.

7. An actuator according to claim 5, wherein said jaw brake is non-rotatable and is releasably engageable with said transmission means to selectively lock said transmission means when said jaw brake is engaged therewith and to unlock said transmission means when disengaged therefrom.

8. An actuator according to claim 7, wherein said transmission means includes at least one gear and said jaw brake is coaxial with and engageable with a face of said gear and movable axially toward and away from said gear to selectively restrain said gear from rotation when said jaw brake is engaged with said gear and to permit rotation of said gear when said jaw is disengaged therefrom.

9. An actuator according to claim 8, wherein said jaw brake is spring biased into engagement with said gear and said solenoid includes a plunger for moving said jaw brake out of engagement with said gear.

10. An actuator according to claim 9, wherein said opening means includes ball screw means driven by said electric motor for disengaging said jaw brake.

11. An actuator according to claim 1, wherein said mechanical motion is linear.

12. An actuator according to claim 1, wherein said mechanical motion is rotary.

13. An actuator according to claim 1 wherein said trigger means includes a solenoid.

14. An actuator according to claim 1, wherein said energy storage means is a spring.

15. An actuator according to claim 1, wherein said operating means is an assembly of a screw threadedly coupled with a a tubular body which in turn is held against rotation.

16. An actuator according to claim 15, wherein a spring acting as the energy storage means biases said tubular body.

17. An actuator according to claim 1, wherein an absorber means is provided to cushion the operating means at the end of its power delivery mechanical motion.

18. An actuator according to claim 1, wherein said transmission means includes a first gear train coupling said trigger means with said operating means, and a second gear train coupling said trigger means with said electric motor.

19. An actuator according to claim 18, wherein said first and second gear trains are parallel to and spaced axially from each other.

20. An actuator according to claim 18, wherein said first gear train includes a planetary gear train having a sun gear coaxial with said operating means and rotatable relative thereto, and a plurality of planet gears carried in a planet carrier secured to said operating means.

21. An actuator according to claim 20, wherein said operating means includes a linearly movable, tubular ram body having a screw thread formed in its inner surface, and an externally threaded jack screw rotatably carried within and in meshing engagement with the screw thread in said ram body, said planet carrier secured to one end of said jack screw.

* * * * *